United States Patent [19]  [11] 3,863,152
Wernitz  [45] Jan. 28, 1975

[54] CIRCUIT FOR USE IN CONNECTION WITH ELECTRIC MEASURED VALUES INDICATORS, ESPECIALLY ELECTROMECHANICAL SCALES

[75] Inventor: Peter Wernitz, Aachen, Germany
[73] Assignee: Dr. Hans Boekels & Co., Aachen, Germany
[22] Filed: Feb. 7, 1973
[21] Appl. No.: 330,260

[30] Foreign Application Priority Data
Feb. 8, 1972 Germany............................ 2205778

[52] U.S. Cl.................................. 324/128, 324/125
[51] Int. Cl............................ G01r 1/38, G01r 1/02
[58] Field of Search ............ 324/128, 125; 307/231, 307/268; 328/128

[56] References Cited
UNITED STATES PATENTS
2,421,578  6/1947  Reason .............................. 324/128
2,567,688  9/1951  Bigelow .............................. 324/125

*Primary Examiner*—Alfred E. Smith
*Assistant Examiner*—Ernest F. Karlsen
*Attorney, Agent, or Firm*—Walter Becker

[57] ABSTRACT

A measuring device, such as a weighing scale emits a direct current voltage signal which is supplied through a filter to a receiver. The filter suppresses alternating current carried by the voltage signal and thereby introduces a delay in the voltage signal supplied to the receiver. To speed up the signal, the signal is differentiated and the resulting pulse is employed to close a switch which is in parallel with the filter thereby substantially eliminating the delay caused by the filter.

5 Claims, 2 Drawing Figures

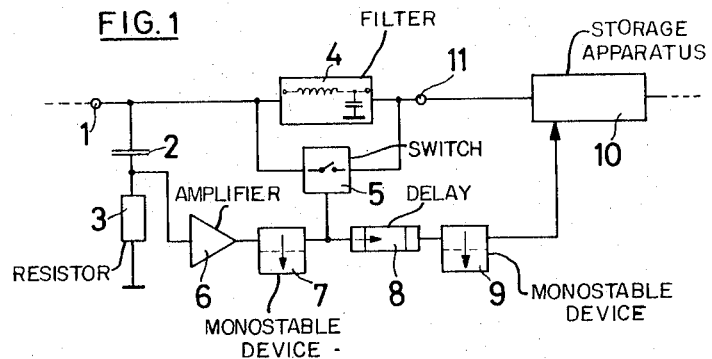
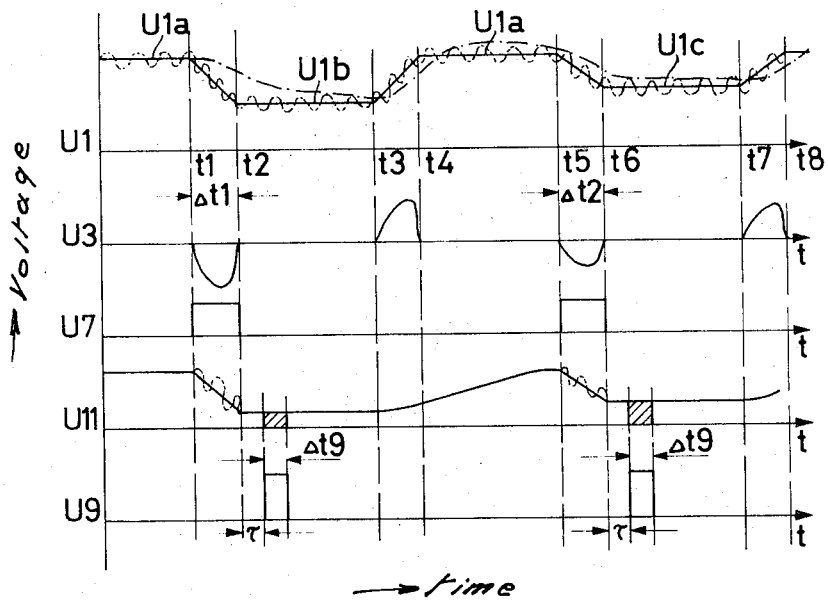

CIRCUIT FOR USE IN CONNECTION WITH ELECTRIC MEASURED VALUES INDICATORS, ESPECIALLY ELECTROMECHANICAL SCALES

The present invention relates to a circuit for use in connection with electric measured values indicators, especially eletromechanical scales which furnish as measured value a direct voltage having superimposed interfering alternating voltages and which give off the measured value in such quick succession that when employing a filter for suppression of the interfering alternating voltages, the properties of said filter would harmfully affect a sufficient build up of the output signal and thereby the precision of the obtained output signal.

Electromechanical scales are known which, dependent on the weight to be ascertained, give off as measuring value an electric direct voltage or direct current signal. These electical measured values have frequently superimposed such high interference alternating voltages, for instance, in view of undesired oscillations of individual structural elements of a scale, that electric filters have to be employed in order to suppress the influence of the interference alternating voltages which falsify the measured value. The employment of such filters, however, entails the drawback that when the measured value is changed, the output signal of the circuit follows this change only with a certain delay which is due to the specific electric properties of the filters involved. This drawback makes itself felt particularly when the measured values are given off in relatively quick succession and are to be recorded and stored accordingly. With a sufficiently close timewise succession of the measured value, it may occur that an output signal will, up to the appearance of the successive measured value, have not even approximately reached the precise value.

Starting from the problems outlined above, it is an object of the present invention so to accelerate the build up of the output signal of the circuit that the output signal will, as quickly as possible, reach at least approximately the precise value while, however, the interfering alternating voltages or signales will be continued to be suppressed.

These and other objects and advantages of the invention will appear more clearly from the following specification, in connection with the accompanying drawings, in which:

FIG. 1 illustrates a preferred embodiment of a circuit according to the invention.

FIG. 2 represents a diagram for explaining the circuit of FIG. 1.

The problems underlying the present invention have been solved according to the present invention which latter is characterized in that by first control means which can be added to the filter or which are introduced into the circuit instead of the filter and have favorable properties for a fast build up, and is furthermore characterized by additional control means for adding or switching on of said control means depending on a change in the measured value and substantially during the entire duration of such change. As a result thereof, the build up of the output signal is effected as fast as possible, because the effect of the filter with regard to the build up is eliminated. During or after completion of the build up, the filter, however, again inserted into or switched on in the circuit for the output signal so that the then following recording or storage of the output signal is effected without being influenced by possible interference alternating voltages.

According to a preferred embodiment, a controllable switch is arranged in parallel with the filter and has its control inlet connected to a differentiating element which is provided between the measured value indicator and the filter. It is, however, also possible instead of this switch, to switch on, for instance, another filter which with regard to a quick build up of the output signal has more favorable properties of its own.

Referring now to the drawing in detail, the inlet 1 of the circuit receives the measured values of the measured value indicator, for instance, an electromechanical scale. Connected to the inlet 1 is a differentiating element which consists of the condenser 2 and the resistor 3. Furthermore, connected to the inlet 1 is a filter 4 which serves for suppressing interfering alternating voltages. Arranged in parallel to said filter 4 is a controllable, preferably electronic switch 5, the control inlet of which, is connected to the outlet of an amplifier 6. The inlet of the amplifier 6 is located at the above described differentiating element. For purposes of controlling the electronic switch 5, preferably between the outlet of the amplifier 6 and the control inlet of the electronic switch 5 there is provided a monostable sweep step 7. At the outlet of the monostable sweep step 7, in addition to the control inlet of the switch 5 there is located the inlet of a delaying device 8, the outlet of which is connected to the inlet of a further monostable sweep step 9. The outlet of the monostable sweep step 9 communicates with the control inlet of a measured value store 10. The measuring inlet of the measured value store 10 is located at the outlet 11 of the filter 4.

The operation of the circuit according to FIG. 1 will be set forth further below.

In the diagram according to FIG. 2, the voltages are plotted over the ordinate, and the time is plotted over the abscissa and, more specifically, the ordinate has marked thereon the individual voltages U 1 at the entrance 1 of the circuit according to FIG. 1, U 3 at the resistor 3 of the differentiating element, U 7 at the outlet of the monostable sweep step 7, U 11 at the outlet 11 of the filter 4, and U 9 at the outlet of the monostable sweep step 9.

It may be assumed that the measured value indicator is represented by an electromechanical scale which in unloaded condition at its outlet gives off a direct voltage U 1. The outlet voltage of the scale or the measuring value indicator is, on one hand conveyed to the filter 4, and on the other hand is conveyed to the differentiating member composed of condenser 2 and resistor 3. It may be further assumed that the scale at the time $t\,1$ is under load of a certain weight for purposes of weighing said load. The weighing dish or plate of the scale requires the time $\Delta t\,1$ in order to reach the position which corresponds to the respective weight and which position, in conformity with FIG. 2, is reached at the time $t\,2$. During the time period $\Delta t\,1$, consequently the input voltage U 1 at the inlet 1 changes from the value U 1 $a$ to the value U 1 $b$. Approximately from the time $t\,2$ on, the voltage U 1 $b$ prevails at the inlet 1, which voltage corresponds to the magnitude of the weight or load to be weighed. After effected weighing and ascertaining of the respective measured value, the weighing dish or plate passes from the time $t\,3$ to the time t 4 back to its starting position so that from the time t 4 on the voltage U 1 a will prevail at the inlet 1. After loading the weighing bridge with the following weight to be weighed at the time t 5, the voltage U 1 a at the inlet 1 changes during the time period Δ t 2 to the value U 1 c. Approximately from the time period t 6 on, therefore, the voltage U 1 c will exist at the inlet 1. After completion of the weighing operation, the voltage U 1 changes in conformity with the above described cycle from the time t 7 on to the time t 8 back to the value U 1 a.

The voltage U 1 is in practice frequently superimposed by such high interfering alternating voltage that even an only approximately precise measured value withdrawn or measured value storage will be impossible. An interfering alternating voltage has, according to the diagram of FIG. 2, superimposed thereon a direct voltage U 1 which is indicated by dash lines.

The disadvantageous effect of the interfering alternating voltage can be suppressed by the filter 4, however, the properties of this filter necessarily bring out a change in the timewise course of the voltage U 1 so that when employing the filter, a voltage would occur at its outlet which would correspond approximately to the dot-dash course as it is illustrated with the voltage U 1. Such voltage course considerably deviating from the course of the voltage U 1 is likewise of no use for obtaining precise measuring results, especially when different measured values are to be recorded quickly in succession.

In order to overcome the obove mentioned difficulties, the voltage U 1 is conveyed to the differentiating element composed of condenser 2 and resistor 3. Thus, at the resistor there will exist the voltage U 3 which is illustrated in FIG. 2 and the course of which is dependent on the changes in the voltage U 1. Disregarding the effect of interfering alternating voltages upon the differentiating member, there will be obtained the voltage pulses shown adjacent the U 3 line. These voltage pulses are conveyed to the amplifier 6 which amplifies said pulses and in addition thereto expediently limits the same. The amplified voltage pulses are conveyed to the inlet of the monostabile sweep step 7 so that the latter will give off approximately rectangular pulses in conformity with the diagram of FIG. 2 adjacent the U 7 line.

The voltage pulses U 7 are conveyed to the control inlet of the electronic switch 5 so that this switch, during the presence of the pulses U 7, is in its closed condition thereby short circuiting the filter 4. In view of this short circuit, the course of the voltage U 11 at the exit 11 corresponds to the course of the voltage U 1 at the inlet 1. Thus, the voltage U 11 has at the time t 2 reached a value which corresponds to the voltage U 1 b. At the time t 2, switch 5 is opened again in view of the delayed voltage pulse U 3 so that the filter 4 again becomes effective. The interfering voltage will thus be suppressed again from this time on. Assuming a measured value U 1 b remaining constant, a corresponding voltage freed from the interfering alternating voltage can be tapped at the outlet 11. This voltage or measured value can be conveyed, for instance, to the store 10, which comprises a separate nondesignated control inlet for determining the time of the storing of a measured value. To this control inlet may be conveyed, for instance, the voltage pulses U 7. However, it is expedient to displace the time of the storing of a measured value, for instance, of the value U 1 b slightly beyond the end of the respective voltage pulse U 7, approximately by the time period τ. In this way, the measured value can build up to its final value when slight differences in voltage at the point 11 due to different resistances between point 1 and point 11 occur when opening or closing the switch 5. In order to realize this, as suggested, a delaying member 8 may be employed which conveys, delayed by the time τ to the inlet of the monstable sweep step 9 pulses derived from voltage pulses U 7. At the outlet of this sweep step 9, voltage pulses U 9 are given off with the time period Δ t 9, which pulses U 9 are conveyed to the control inlet of store 10. During the time period Δ t 9 the store 10 stores the respective measured value prevailing at the outlet 11. In addition to this voltage course U 11 in diagram 2, those ranges are shaded which are used for storing the measured values U 1 b and U 1 c.

It is, of course, to be understood that the present invention is, by no means, limited to the particular showing in the drawing, but also comprises any modifications within the scope of the appended claims.

What is claimed is:

1. In combination with an electric circuit for conveying direct current voltage values corresponding to quantities to be measured to a receiver while suppressing alternating current voltages; measuring means operable for developing a direct current voltage signal which varies in conformity with the quantity measured and having an output terminal, a receiver adapted for actuation by the said direct current voltage signal and having an input terminal, a filter connecting said output terminal to said input terminal and operable only temporary to suppress alternating current interference appearing with said direct current voltage signal, a normally nonconductive switch connected in parallel with said filter, and measuring differentiation control means operable in response to a change in said direct current voltage signal in at least one direction for making said switch conductive only during substantially the entire period of time over which said change takes place.

2. An electric circuit in combination according to claim 1 in which said control means comprises a differentiator to which said direct current voltage signal is applied and switch actuating means connected to said differentiator.

3. An electric circuit in combination according to claim 1 in which said switch has a control terminal sensitive to a control signal to actuate the switch into conductive condition, said control means comprising a differentiator in the form of a capacitor having one side connected to receive said direct current voltage signal and a resistor connected to the other side of said capacitor, an amplifier having an input terminal connected to the resistor side of said capacitor and having an output terminal, and a monostable multivibrator having a trigger terminal connected to the output terminal of said amplifier and having an output side connected to said control terminal of said switch.

4. An electric circuit in combination according to claim 3 in which said receiver comprises a signal controlled input gate, and a further monostable multivibrator having a trigger terminal connected to the said output side of the first mentioned monostable multivibrator and having an output side connected to supply signals to said input gate.

5. An electric circuit in combination according to claim 4 which includes time delay means interposed between the output side of said first mentioned monostable multivibrator and the trigger terminal of said further monostable multivibrator.

* * * * *